US012324046B1

(12) United States Patent
McClure

(10) Patent No.: US 12,324,046 B1
(45) Date of Patent: Jun. 3, 2025

(54) MULTICAST AND BROADBAND SERVICE COMMUNICATION WITH MOBILE TERMINATED SMALL DATA TRANSMISSION

(71) Applicant: AerKodo, LLC, Midlothian, TX (US)

(72) Inventor: Kenneth McClure, Midlothian, TX (US)

(73) Assignee: AerKodo, LLC, Midlothian, TX (US)

( * ) Notice: Subject to any disclaimer, the term of this patent is extended or adjusted under 35 U.S.C. 154(b) by 0 days.

(21) Appl. No.: 19/006,079

(22) Filed: Dec. 30, 2024

Related U.S. Application Data

(60) Provisional application No. 63/716,176, filed on Nov. 4, 2024.

(51) Int. Cl.
*H04W 76/27* (2018.01)
*H04B 17/318* (2015.01)
*H04W 76/40* (2018.01)

(52) U.S. Cl.
CPC .......... *H04W 76/27* (2018.02); *H04B 17/328* (2023.05); *H04W 76/40* (2018.02)

(58) Field of Classification Search
CPC ..... H04W 76/27; H04W 76/40; H04B 17/328
See application file for complete search history.

(56) References Cited

U.S. PATENT DOCUMENTS

| | | | |
|---|---|---|---|
| 2024/0188038 A1* | 6/2024 | Martinez Tarradell | ...... H04W 76/27 |
| 2024/0267912 A1* | 8/2024 | Lei | ......... H04L 5/0094 |
| 2025/0048485 A1* | 2/2025 | Lei | ......... H04W 76/27 |
| 2025/0071852 A1* | 2/2025 | Yu | ......... H04W 76/25 |

OTHER PUBLICATIONS

3GPP TS 38.321 V18.3.0 (Sep. 2024), 335 pages.
3GPP TS 38.331 V18.3.0 (Sep. 2024), 1,694 pages.

* cited by examiner

*Primary Examiner* — Will W Lin

(57) ABSTRACT

A method comprising receiving configuration information for a plurality of multicast Multicast and Broadcast Service (MBS) sessions and configuration information for a plurality of broadcast MBS sessions, receiving a paging transmission that includes at least one paging record, the paging record comprising: a mobile terminated small data transmission (MT-SDT) indicator, and a paging group list comprising a plurality of MBS session identifiers, initiating an RRC connection resumption procedure, based on the at least one paging record, with a resume cause set to indicate MT-SDT in circumstances where conditions for receiving data in the RRC_INACTIVE state are determined as satisfied, and all MBS sessions indicated by the MBS session identifiers included in the paging group list are configured for receiving data in an RRC_INACTIVE state, and initiating an RRC connection resumption procedure, based on the at least one paging record, with a resume cause set to indicate mobile terminated access (MT-Access) in circumstances where conditions for receiving data in the RRC_INACTIVE state are determined as not satisfied, or not all MBS sessions indicated by the MBS session identifiers included in the paging group list are configured for receiving data in an RRC_INACTIVE state is disclosed.

20 Claims, 3 Drawing Sheets

MULTICAST AND BROADBAND SERVICE COMMUNICATION WITH MOBILE TERMINATED SMALL DATA TRANSMISSION

TECHNICAL FIELD

The present application relates generally to small data transmission of a wireless device.

BACKGROUND

As wireless devices transmit and receive greater amounts of data, it becomes increasingly important for the communication of data to become more efficient. In many circumstances it may be desirable to communicate information in RRC_INACTIVE state. However, performing such communication for Multicast and Broadcast Service (MBS) communications requires specific configuration and operations.

SUMMARY

Various aspects of examples of the invention are set out in the claims.

One or more embodiments may provide an apparatus, a computer readable medium, a non-transitory computer readable medium, a computer program product, and/or a method for a method performed by a user equipment (UE) comprising: receiving configuration information for a plurality of multicast Multicast and Broadcast Service (MBS) sessions that are configured for receiving data in an RRC_INACTIVE state and configuration information for a plurality of broadcast MBS sessions that are not configured for receiving data in the RRC_INACTIVE state, receiving, while the UE is in RRC_INACTIVE state, a paging transmission that includes at least one paging record, the paging record comprising: a UE identity that matches a Radio Network Temporary Identifier (RNTI) of the UE, a mobile terminated small data transmission (MT-SDT) indicator, and a paging group list comprising a plurality of MBS session identifiers, determining whether or not conditions for receiving data in the RRC_INACTIVE state are satisfied, determining whether or not all MBS sessions indicated by the MBS session identifiers included in the paging group list are configured for receiving data in an RRC_INACTIVE state, initiating an RRC connection resumption procedure, based on the at least one paging record, with a resume cause set to indicate MT-SDT in circumstances where: conditions for receiving data in the RRC_INACTIVE state are determined as satisfied, and all MBS sessions indicated by the MBS session identifiers included in the paging group list are configured for receiving data in an RRC_INACTIVE state; initiating an RRC connection resumption procedure, based on the at least one paging record, with a resume cause set to indicate mobile terminated access (MT-Access) in circumstances where: conditions for receiving data in the RRC_INACTIVE state are determined as not satisfied, or not all MBS sessions indicated by the MBS session identifiers included in the paging group list are configured for receiving data in an RRC_INACTIVE state.

An apparatus comprising at least one processor and at least one memory, the memory comprising machine-readable instructions, that when executed cause the apparatus to receive configuration information for a plurality of multicast Multicast and Broadcast Service (MBS) sessions that are configured for receiving data in an RRC_INACTIVE state and configuration information for a plurality of broadcast MBS sessions that are not configured for receiving data in the RRC_INACTIVE state, receive, while the UE is in RRC_INACTIVE state, a paging transmission that includes at least one paging record, the paging record comprising: a UE identity that matches an RNTI of the UE, a mobile terminated small data transmission (MT-SDT) indicator, and a paging group list comprising a plurality of MBS session identifiers, determine whether or not conditions for receiving data in the RRC_INACTIVE state are satisfied, determine whether or not all MBS sessions indicated by the MBS session identifiers included in the paging group list are configured for receiving data in an RRC_INACTIVE state, initiate an RRC connection resumption procedure, based on the at least one paging record, with a resume cause set to indicate MT-SDT in circumstances where: conditions for receiving data in the RRC_INACTIVE state are determined as satisfied, and all MBS sessions indicated by the MBS session identifiers included in the paging group list are configured for receiving data in an RRC_INACTIVE state, initiate an RRC connection resumption procedure, based on the at least one paging record, with a resume cause set to indicate mobile terminated access (MT-Access) in circumstances where: conditions for receiving data in the RRC_INACTIVE state are determined as not satisfied, or not all MBS sessions indicated by the MBS session identifiers included in the paging group list are configured for receiving data in an RRC_INACTIVE state.

In at least one example embodiment, each multicast MBS session and each broadcast MBS session is identified by an MBS session identifier, and determining whether or not all MBS sessions indicated by the MBS session identifiers included in the paging group list are configured for receiving data in an RRC_INACTIVE state comprises determining whether or not each of the MBS session identifiers included in the paging group list identifies a multicast MBS session that is configured for receiving data in an RRC_INACTIVE state.

In at least one example embodiment, the MBS session identifier is a Temporary Mobile Group Identity (TMGI).

In at least one example embodiment, the paging transmission is a paging message received from a base station.

In at least one example embodiment, the base station is a gNodeB (gNB).

In at least one example embodiment, the paging transmission is a message transfer sidelink message received from another UE.

In at least one example embodiment, the other UE is a Layer 2 (L2) UE to Network (U2N) Relay UE.

In at least one example embodiment, the RNTI of the UE is a full Inactive-RNTI (I-RNTI).

In at least one example embodiment, determining whether or not conditions for receiving data in the RRC_INACTIVE state are satisfied comprises determining, by a Medium Access Control (MAC) entity, whether or not conditions for initiating Small Data Transmission (SDT) procedures are fulfilled.

In at least one example embodiment, determining whether or not conditions for initiating SDT procedures are fulfilled comprises determining whether or not a RSRP of a downlink pathloss reference is higher than a configured RSRP threshold for SDT.

In at least one example embodiment, determining that conditions for initiating SDT procedures are fulfilled comprises determining that the RSRP of the downlink pathloss reference is higher than the configured RSRP threshold for SDT.

In at least one example embodiment, determining that conditions for initiating SDT procedures are not fulfilled comprises determining that the RSRP of the downlink pathloss reference is not higher than the configured RSRP threshold for SDT.

In at least one example embodiment, the configuration information for the plurality of multicast MBS sessions is received in an MBS multicast configuration message and the configuration information for the plurality of broadcast MBS sessions are received in an MBS broadcast configuration message.

In at least one example embodiment, the MBS multicast configuration message and the MBS broadcast configuration message are distinct from each other.

In at least one example embodiment, the MBS multicast configuration message includes information that cannot be included in the MBS broadcast configuration message.

In at least one example embodiment, a subset of parameters included in the MBS multicast configuration message are present in the MBS broadcast configuration message.

In at least one example embodiment, the configuration information for the plurality of multicast MBS sessions comprises an MBS session information list for multicast and the configuration information for the plurality of broadcast MBS sessions is an MBS session information list for broadcast.

In at least one example embodiment, the MBS multicast configuration message comprises the MBS session information list for multicast and the MBS broadcast configuration message comprises the MBS session information list for broadcast.

In at least one example embodiment, the MBS session information list for broadcast is an MBS-SessionInfoList information element.

In at least one example embodiment, the configuration information for the plurality of multicast MBS sessions and the configuration information for the plurality of broadcast MBS sessions are received in a common MBS configuration message.

In at least one example embodiment, the configuration information for the plurality of multicast MBS sessions comprises an MBS session information list for multicast and the configuration information for the plurality of broadcast MBS sessions is an MBS session information list for broadcast.

In at least one example embodiment, the MBS session information list for broadcast is an MBS-SessionInfoList information element.

In at least one example embodiment, the configuration information for the plurality of multicast MBS sessions and the configuration information for the plurality of broadcast MBS sessions are included in a common MBS session information list.

In at least one example embodiment, the configuration information for the plurality of multicast MBS sessions comprises a plurality of common MBS session information elements included in the common MBS session information list and the plurality of broadcast MBS sessions are a different plurality of common MBS session information elements included in the common MBS session information list.

In at least one example embodiment, the plurality of broadcast MBS sessions are a plurality of common MBS session information elements included in the common MBS session information list that are different from the common MBS session information elements of the multicast MBS sessions.

In at least one example embodiment, the common MBS session information list is an MBS-SessionInfoList information element.

In at least one example embodiment, the common MBS session information element is an MBS-SessionInfo information element.

In at least one example embodiment, the configuration information for a plurality of multicast MBS sessions corresponds with the common MBS session information records that include the optional parameters that are specific to multicast MBS. In at least one example embodiment, the configuration information for a plurality of broadcast MBS sessions corresponds with the common MBS session information records that do not include the optional parameters that are specific to multicast MBS.

BRIEF DESCRIPTION OF THE DRAWINGS

For a more complete understanding of embodiments of the invention, reference is now made to the following descriptions taken in connection with the accompanying drawings in which.

DETAILED DESCRIPTION

Figure 1:
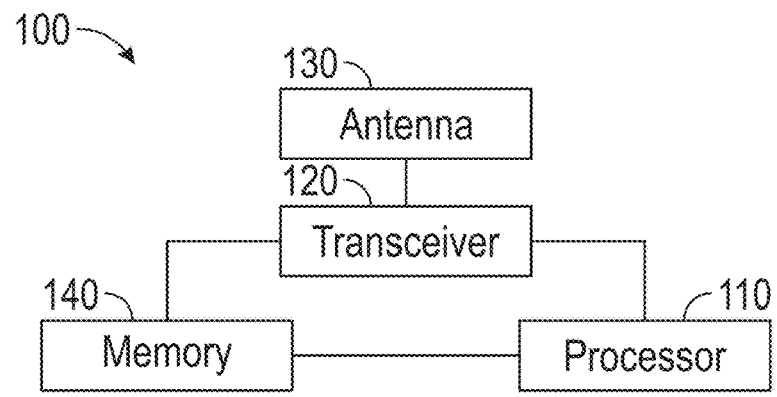
FIG. 1 is a block diagram illustrating an apparatus according to at least one example embodiment.

An embodiment of the invention and its potential advantages are understood by referring to FIGS. 1 through 5 of the drawings.

Some embodiments will now be described more fully hereinafter with reference to the accompanying drawings, in which some, but not all, embodiments are shown. Various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network apparatus, other network apparatus, and/or other computing apparatus.

As defined herein, a "non-transitory computer-readable medium," which refers to a physical medium (e.g., volatile or non-volatile memory device), can be differentiated from a "transitory computer-readable medium," which refers to an electromagnetic signal.

FIG. 1 is a block diagram showing an apparatus, such as an electronic apparatus 100, according to at least one example embodiment. It should be understood, however, that an electronic apparatus as illustrated and hereinafter described is merely illustrative of an electronic apparatus that could benefit from embodiments of the invention and, therefore, should not be taken to limit the scope of the invention. While electronic apparatus 100 is illustrated and will be hereinafter described for purposes of example, other types of electronic apparatuses may readily employ embodiments of the invention. Electronic apparatus 100 may be a network node, such as a user equipment (UE) or a base station, or may be a personal digital assistant (PDAs), a pager, a mobile computer, a desktop computer, a television, a gaming apparatus, a laptop computer, a tablet computer, a media player, a camera, a video recorder, a mobile phone, a global positioning system (GPS) apparatus, an automobile, a kiosk, an electronic table, and/or any other types of electronic systems. Moreover, the apparatus of at least one example embodiment need not be the entire electronic apparatus but may be a component or group of components of the electronic apparatus in other example embodiments. For example, the apparatus may be an integrated circuit, a set of integrated circuits, and/or the like.

Furthermore, apparatuses may readily employ embodiments of the invention regardless of their intent to provide mobility. In this regard, even though embodiments of the invention may be described in conjunction with mobile applications, it should be understood that embodiments of the invention may be utilized in conjunction with a variety of other applications, both in the mobile communications industries and outside of the mobile communications industries. For example, the apparatus may be, at least part of, a non-carryable apparatus, such as a large screen television, an electronic table, a kiosk, an automobile, and/or the like.

In at least one example embodiment, electronic apparatus 100 comprises processor 110 and memory 140. Processor 110 may be any type of processor, controller, embedded controller, processor core, and/or the like. In at least one example embodiment, processor 110 utilizes computer program code to cause an apparatus to perform one or more actions. Memory 140 may comprise volatile memory, such as volatile Random Access Memory (RAM) including a cache area for the temporary storage of data and/or other memory, for example, non-volatile memory, which may be embedded and/or may be removable. The non-volatile memory may comprise an EEPROM, flash memory and/or the like. Memory 140 may store any of a number of pieces of information, and data. The information and data may be used by electronic apparatus 100 to implement one or more functions of the electronic apparatus 100, such as the functions described herein. In at least one example embodiment, memory 140 includes computer program code such that the memory and the computer program code are configured to, working with the processor, cause the apparatus to perform one or more actions described herein.

The electronic apparatus 100 may further comprise a transceiver 120. In at least one example embodiment, transceiver 120 is coupled with one or more antennae 130. In at least one example embodiment, processor 110 provides and or receives signals to/from transceiver 120. The signals may comprise signaling information in accordance with a communications interface standard, user speech, received data, user generated data, and/or the like. Transceiver 120 may operate with one or more air interface standards, communication protocols, modulation types, and access types. By way of illustration, the electronic transceiver 120 may operate in accordance with second-generation (2G) wireless communication protocols IS-136 (time division multiple access (TDMA)), Global System for Mobile communications (GSM), and IS-95 (code division multiple access (CDMA)), with third-generation (3G) wireless communication protocols, such as Universal Mobile Telecommunications System (UMTS), CDMA2000, wideband CDMA (WCDMA) and time division-synchronous CDMA (TD-SCDMA), and/or with fourth-generation (4G) wireless communication protocols such as LTE, fifth-generation (5G) protocols such as New Radio (NR) wireless networking protocols, such as 802.11, short-range wireless protocols, such as Bluetooth, and/or the like.

Processor 110 may comprise means, such as circuitry, for implementing audio, video, communication, navigation, logic functions, and/or the like, as well as for implementing embodiments of the invention including, for example, one or more of the functions described herein. For example, processor 110 may comprise means, such as a digital signal processor device, a microprocessor device, various analog to digital converters, digital to analog converters, processing circuitry and other support circuits, for performing various functions including, for example, one or more of the functions described herein. The apparatus may perform control and signal processing functions of the electronic apparatus 100 among these devices according to their respective capabilities. The processor 110 thus may comprise the functionality to encode and interleave message and data prior to modulation and transmission. Processor 1 may additionally comprise an internal voice coder and may comprise an internal data modem. Further, the processor 110 may comprise functionality to operate one or more software programs, which may be stored in memory, and which may, among other things, cause the processor 110 to implement at least a portion of one embodiment including, for example, one or more of the functions described herein. For example, the processor 110 may operate a connectivity program, such as a conventional internet browser. The connectivity program may allow the electronic apparatus 100 to transmit and receive internet content, such as location-based content and/or other web page content, according to a Transmission Control Protocol (TCP), Internet Protocol (IP), User Datagram Protocol (UDP), Internet Message Access Protocol (IMAP), Post Office Protocol (POP), Simple Mail Transfer Protocol (SMTP), Wireless Application Protocol (WAP), Hypertext Transfer Protocol (HTTP), and/or the like, for example.

The electronic apparatus 100 may comprise a user interface for providing output and/or receiving input. The electronic apparatus 100 may comprise an output device, which may comprise an audio output device, such as a ringer, an earphone, a speaker, a tactile output device, such as a vibration transducer, an electronically deformable surface, an electronically deformable structure, a visual output device, such as a display and/or a light. The electronic apparatus may comprise an input device such as a light sensor, a proximity sensor, a microphone, a touch sensor, a force sensor, a button, a keypad, a motion sensor, a magnetic field sensor, a camera, and/or the like. In at least one example embodiment, the apparatus receives an indication of an input. The apparatus may receive the indication from a sensor, a driver, a separate apparatus, and/or the like. The information indicative of the input may comprise information that conveys information indicative of the input, indicative of an aspect of the input indicative of occurrence of the input, and/or the like.

Figure 2:
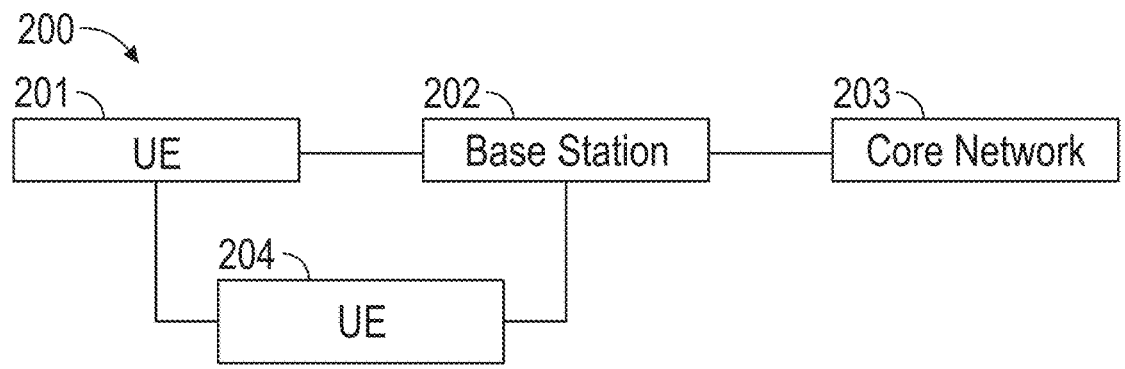
FIG. 2 is a block diagram illustrating a wireless communications system, according to at least one example embodiment.

FIG. 2 illustrates an example of a wireless communications system 200, according to at least one example embodiment. The wireless communications system 200 includes one or more base stations 202, a core network 203, and one or more user equipment (UE), such as UE 201 and/or UE 204. In some examples, the wireless communications system 200 may be a Long Term Evolution (LTE), LTE-Advanced (LTE-A) network, a New Radio (NR) network, etc. In some circumstances, wireless communications system 200 may support enhanced broadband communications, ultra-reliable (i.e., mission critical) communications, low latency communications, and communications with low-cost and low-complexity devices. To improve the reliability of some communications (e.g., ultra-reliable low latency communications (URLLC) packets), the wireless communications system 200 may be configured to generate and transmit duplicate packets. In such duplication systems, a transmitting device (e.g., base station 202, UE 201, or UE 204) may duplicate a packet. The original packet and duplicated packets may be transmitted to a receiving device (e.g., base station 202, UE 201, or UE 204). Transmitting multiple packets that include the same information may improve the likelihood that the receiving device receives the information included in the multiple packets.

One or more base stations 202 may wirelessly communicate with one or more UEs (e.g. UE 201 or UE 204) via one or more base station antennas. Each base station 202 may provide communication coverage for a respective geographic coverage area. Communication links in wireless communications system 200 may include uplink transmissions from a UE to a base station 202, or downlink transmissions, from a base station 202 to a UE. Control information and data may be multiplexed on an uplink channel or downlink according to various techniques. Control information and data may be multiplexed on a downlink channel, for example, using time division multiplexing (TDM) techniques, frequency division multiplexing (FDM) techniques, or hybrid TDM-FDM techniques. In some examples, the control information transmitted during a transmission time interval (TTI) of a downlink channel may be distributed between different control regions in a cascaded manner (e.g., between a common control region and one or more UE-specific control regions).

A plurality of UEs may be dispersed throughout the wireless communications system 200, and each UE may be stationary or mobile. A UE may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE may also be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of Things (IoT) device, an Internet of Everything (IoE) device, a machine type communication (MTC) device, an appliance, an automobile, or the like.

In some circumstances, a UE may also be able to communicate directly with other UEs using sidelink communication (e.g., using a peer-to-peer (P2P) or device-to-device (D2D) protocol). For example, FIG. 2 provides an example of such communication between UE 201 and UE 204. One or more of a group of UEs utilizing sidelink communications may be within the coverage area of a cell. Other UEs in such a group may be outside the coverage area of a cell, or otherwise unable to receive transmissions from base station 202. In some circumstances, groups of UEs communicating via sidelink communications may utilize a one-to-many (1:M) system in which each UE transmits to every other UE in the group. In some circumstances, base station 202 facilitates the scheduling of resources for sidelink communications. In other circumstances, sidelink communications are carried out independent of base station 202.

In some circumstances, UE 204 may operate as a relay UE for UE 201. For example, instead of UE communicating directly with base station 202, UE 204 may be configured to operate as a relay such that UE 201 communicates to base station 202 via communication directly through UE 204. For example, UE 204 may operate as a Layer 2 (L2) UE to Network (U2N) relay.

Some UEs, such as MTC or IoT devices, may be low cost or low complexity devices, and may provide for automated communication between machines, i.e., Machine-to-Machine (M2M) communication. M2M or MTC may refer to data communication technologies that allow devices to communicate with one another or a base station without human intervention. For example, M2M or MTC may refer to communications from devices that integrate sensors or meters to measure or capture information and relay that information to a central server or application program that can make use of the information or present the information to humans interacting with the program or application. Some UEs may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

In some circumstances, an MTC device may operate using half-duplex (one-way) communications at a reduced peak rate. MTC devices may also be configured to enter a power saving "deep sleep" mode when not engaging in active communications. In some circumstances, MTC or IoT devices may be designed to support mission critical functions and wireless communication systems may be configured to provide ultra-reliable communications for these functions.

Base station 202 may communicate with the core network 203 and with one or more other base stations. For example, base stations may interface with the core network 203 through come backhaul links (e.g., S1, etc.). Base stations may communicate with one another over other backhaul links (e.g., X2, etc.) either directly or indirectly (e.g., through core network 203). Base stations may perform radio configuration and scheduling for communication with UEs or may operate under the control of a base station controller (not shown). In some examples, base station 202 may be a macro cell, a small cell, a hot spot, and/or the like. Base stations may also be referred to as evolved NodeBs (NBs), such as eNBs, gNBs and/or the like.

Base station 202 may be connected by an S1 interface to core network 203. The core network may be an evolved packet core (EPC), which may include at least one mobility management entity (MME), at least one serving gateway (S-GW), and at least one Packet Data Network (PDN) gateway (P-GW). The MME may be the control node that processes the signaling between UE 201 and the EPC. All user Internet Protocol (IP) packets may be transferred through the S-GW, which itself may be connected to the P-GW. The P-GW may provide IP address allocation as well as other functions. The P-GW may be connected to the network operators IP services. The operator's IP services may include the Internet, the Intranet, an IP Multimedia Subsystem (IMS), and a Packet-Switched (PS) Streaming Service.

The core network 203 may provide user authentication, access authorization, tracking, IP connectivity, and other access, routing, or mobility functions. At least some of the network devices, such as base station 202 may include subcomponents such as an access network entity, which may be an example of an access node controller (ANC). Each access network entity may communicate with a number of UEs through a number of other access network transmission entities, each of which may be an example of a smart radio head, or a transmission/reception point (TRP). In some configurations, various functions of each access network entity or base station may be distributed across various network devices (e.g., radio heads and access network controllers) or consolidated into a single network device (e.g., base station 202).

Wireless communications system 200 may operate in an ultra-high frequency (UHF) frequency region using frequency bands from 700 MHz to 2600 MHz (2.6 GHz), although some networks (e.g., a wireless local area network (WLAN)) may use frequencies as high as 4 GHz. This region may also be known as the decimeter band, since the wavelengths range from approximately one decimeter to one meter in length. UHF waves may propagate mainly by line of sight and may be blocked by buildings and environmental features. However, the waves may penetrate walls sufficiently to provide service to UEs located indoors. Transmission of UHF waves is characterized by smaller antennas and shorter range (e.g., less than 100 km) compared to transmission using the smaller frequencies (and longer waves) of the high frequency (HF) or very high frequency (VHF) portion of the spectrum. In some circumstances, wireless communications system 200 may also utilize extremely high frequency (EHF) portions of the spectrum (e.g., from 30 GHz to 300 GHz). This region may also be known as the millimeter band, since the wavelengths range from approximately one millimeter to one centimeter in length. Thus, EHF antennas may be even smaller and more closely spaced than UHF antennas. In some circumstances, this may facilitate the use of antenna arrays within UE 201 (e.g., for directional beamforming). However, EHF transmissions may be subject to even greater atmospheric attenuation and shorter range than UHF transmissions.

Thus, wireless communications system 200 may support millimeter wave (mmW) communications between UEs and base stations. Devices operating in mmW or EHF bands may have multiple antennas to allow beamforming. That is, base station 202 may use multiple antennas or antenna arrays to conduct beamforming operations for directional communications with UE 201. Beamforming (which may also be referred to as spatial filtering or directional transmission) is a signal processing technique that may be used at a transmitter (e.g., a base station) to shape and/or steer an overall antenna beam in the direction of a target receiver (e.g., a UE). This may be achieved by combining elements in an antenna array in such a way that transmitted signals at particular angles experience constructive interference while others experience destructive interference.

Multiple-input multiple-output (MIMO) wireless systems use a transmission scheme between a transmitter (e.g., a base station) and a receiver (e.g., a UE), where both transmitter and receiver are equipped with multiple antennas. Some portions of wireless communications system 200 may use beamforming. For example, base station 202 may have an antenna array with a number of rows and columns of antenna ports that the base station may use for beamforming in its communication with UE 201. Signals may be transmitted multiple times in different directions (e.g., each transmission may be beamformed differently). A mmW receiver (e.g., a UE) may try multiple beams (e.g., antenna subarrays) while receiving the synchronization signals.

In some circumstances, the antennas of base station 202 or UE 201 may be located within one or more antenna arrays, which may support beamforming or MIMO operation. One or more base station antennas or antenna arrays may be collocated at an antenna assembly, such as an antenna tower. In some circumstances, antennas or antenna arrays associated with base station 202 may be located in diverse geographic locations. Base station 202 may use multiple antennas or antenna arrays to conduct beamforming operations for directional communications with UE 201.

In some circumstances, wireless communications system 200 may be a packet-based network that operates according to a layered protocol stack. In the user plane, communications at the bearer or PDCP layer may be IP-based. An RLC layer may in some circumstances perform packet segmentation and reassembly to communicate over logical channels. A Medium Access Control (MAC) layer may perform priority handling and multiplexing of logical channels into transport channels. The MAC layer may also use Hybrid Automatic Repeat Request (HARQ) to provide retransmission at the MAC layer to improve link efficiency. In the control plane, the Radio Resource Control (RRC) protocol layer may provide establishment, configuration, and maintenance of an RRC connection between UE 201 and a network device or core network 203 supporting radio bearers for user plane data. At the Physical (PHY) layer, transport channels may be mapped to physical channels.

Time intervals in LTE or NR may be expressed in multiples of a basic time unit (which may be a sampling period of $T_s=1/30,720,000$ seconds). Time resources may be organized according to radio frames of length of 10 ms ($T_f=307200$ Ts), which may be identified by a system frame number (SFN) ranging from 0 to 1023. Each frame may include ten one ms subframes numbered from zero to nine. A subframe may be further divided into two 0.5 ms slots, each of which contains six or seven modulation symbol periods (depending on the length of the cyclic prefix prepended to each symbol). Excluding the cyclic prefix, each symbol contains 2048 sample periods. In some circumstances, the subframe may be the smallest scheduling unit, also known as a TTI. In other circumstances, a TTI may be shorter than a subframe or may be dynamically selected (e.g., in short TTI bursts or in selected component carriers using short TTIs).

A resource element may consist of one symbol period and one subcarrier (e.g., a 15 KHz frequency range). A resource block may contain twelve consecutive subcarriers in the frequency domain and, for a normal cyclic prefix in each orthogonal frequency-division multiplexing (OFDM) symbol, seven consecutive OFDM symbols in the time domain (one slot), or 84 resource elements. The number of bits carried by each resource element may depend on the modulation scheme (the configuration of symbols that may be selected during each symbol period). Thus, the more resource blocks that a UE receives and the higher the modulation scheme, the higher the data rate may be.

Wireless communications system 200 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. UE 201 may be configured with multiple downlink CCs and one or more uplink CCs for carrier aggregation. Carrier aggregation may be used with both frequency division duplexing (FDD) and time division duplexing (TDD) component carriers.

In some circumstances, wireless system 200 may utilize both licensed and unlicensed radio frequency spectrum bands. For example, wireless system 200 may employ LTE License Assisted Access (LTE-LAA) or LTE Unlicensed (LTE U) radio access technology or NR technology in an unlicensed band such as the 5 Ghz Industrial, Scientific, and Medical (ISM) band. When operating in unlicensed radio frequency spectrum bands, wireless devices such as base station 202 and UE 201 may employ listen-before-talk (LBT) procedures to ensure the channel is clear before transmitting data. In some circumstances, operations in unlicensed bands may be based on a CA configuration in conjunction with CCs operating in a licensed band. Operations in unlicensed spectrum may include downlink transmissions, uplink transmissions, or both. Duplexing in unlicensed spectrum may be based on FDD, TDD, or a combination of both.

Figure 3:
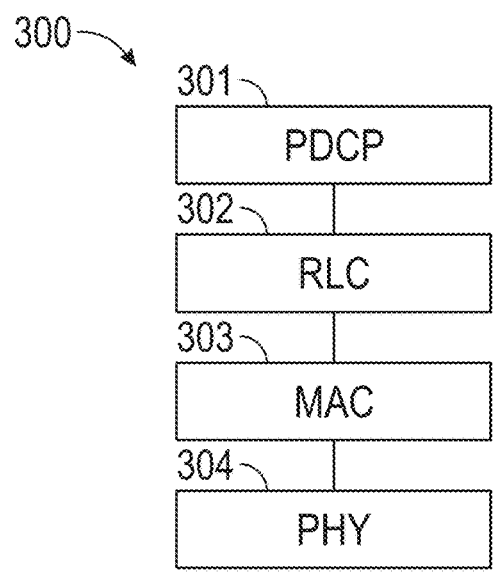
FIG. 3 is a diagram illustrating a protocol stack 300 according to at least one example embodiment.

FIG. 3 is a diagram illustrating a protocol stack 300 according to at least one example embodiment. The example of FIG. 3 is merely an example and does not necessarily limit the scope of the claims.

In at least one example embodiment, physical (PHY) layer 304 provides an information transfer service to a higher layer using a physical channel. The PHY layer 304 may be connected to a medium access control (MAC) layer 303 located on the higher layer via a transport channel. Data may be transported between the MAC layer 303 and the PHY layer 304 via the transport channel. Data may be transported between a physical layer of a transmitting side and a physical layer of a receiving side via physical channels. The physical channels use time and frequency as radio resources. In some circumstances, the physical channel is modulated using an orthogonal frequency division multiple access (OFDMA) scheme in downlink and is modulated using a single carrier frequency division multiple access (SC-FDMA) scheme in uplink.

In at least one example embodiment, MAC layer 303 provides a service to a radio link control (RLC) layer 302 of a higher layer via a logical channel. The RLC layer 302 of the second layer supports reliable data transmission. A function of the RLC layer 302 may be implemented by a functional block of the MAC layer 303. A packet data convergence protocol (PDCP) layer 301 performs a header compression function to reduce unnecessary control information for efficient transmission of an Internet protocol (IP) packet such as an IP version 4 (IPv4) packet or an IP version 6 (IPv6) packet in a radio interface having a relatively small bandwidth.

In at least one example embodiment, PDCP layer 301 is implemented by way of a PDCP entity that performs various actions of the PDCP layer. In this manner, an operating network node comprises one or more PDCP entities for performing PDCP layer activities. In operation, the PDCP entity receives data for transmission from higher layers in a PDCP service data unit (SDU). The PDCP entity performs various operations on the PDCP SDUs that it receives from higher layers for transmission, such as header compression, uplink data compression, integrity protection, ciphering, and/or the like. The PDCP entity performs these operations on a received PDCP SDU to generate a PDCP packet data unit (PDU) that is transmitted by way of the PDCP entity sending the PDCP SDU to lower layers for transmission.

In at least one example embodiment, RLC layer 302 is implemented by way of a RLC entity that performs various actions of the RLC layer. In this manner, an operating network node comprises one or more RLC entities for performing RLC layer activities. In operation, the RLC entity receives data for transmission from higher layers in a RLC SDU. The RLC entity performs various operations on the RLC SDUs that it receives from higher layers for transmission, such as header compression, uplink data compression, integrity protection, ciphering, and/or the like. The RLC entity performs these operations on a received RLC SDU to generate a RLC PDU that is transmitted by way of the RLC entity sending the RLC SDU to lower layers for transmission.

In at least one example embodiment, MAC layer 303 is implemented by way of a MAC entity that performs various actions of the MAC layer. In this manner, an operating network node comprises one or more MAC entities for performing MAC layer activities. In operation, the MAC entity receives data for transmission from higher layers in a MAC SDU. The MAC entity performs various operations on the MAC SDUs that it receives from higher layers for transmission, such as header compression, uplink data compression, integrity protection, ciphering, and/or the like. The MAC entity performs these operations on a received MAC SDU to generate a MAC PDU that is transmitted by way of the MAC entity sending the MAC SDU to lower layers for transmission.

Figure 4:
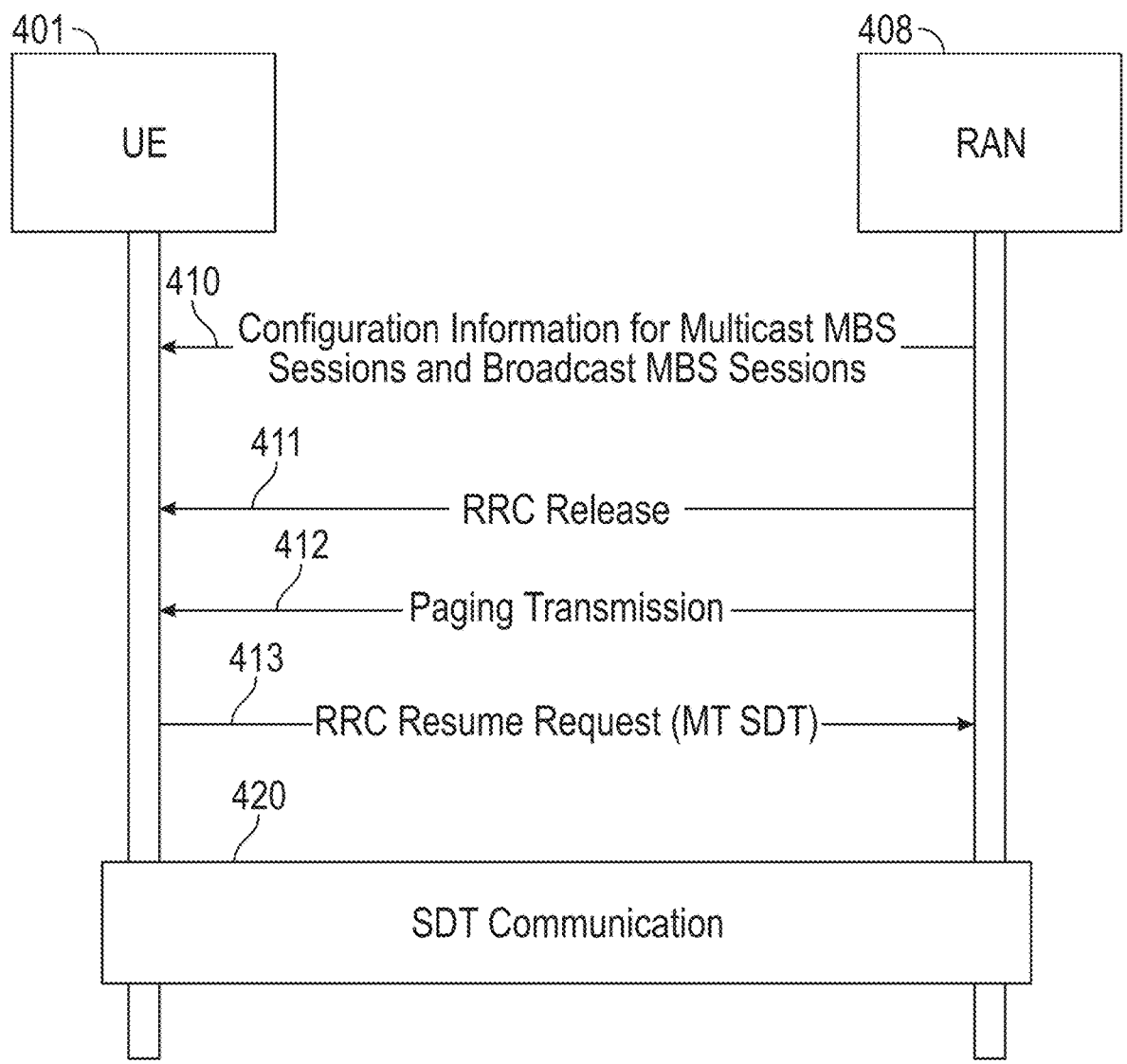
FIG. 4 is an interaction diagram illustrating activities associated with Mobile Terminated Small Data Transmission (MT-SDT) according to at least one example embodiment.

FIG. 4 is an interaction diagram illustrating activities (400) associated with Mobile Terminated Small Data Transmission (MT-SDT) according to at least one example embodiment. In at least one example embodiment, there is a set of operations that corresponds with, at least some of, the activities of FIG. 4. For example, there may be a set of operations associated with activities of one or more apparatuses of FIG. 4. An apparatus, for example electronic apparatus 100 of FIG. 1, or a portion thereof, apparatus 201 of FIG. 2, or a portion thereof, apparatus 202 of FIG. 2, or a portion thereof, or apparatus 204 of FIG. 2, or a portion thereof, may utilize the set of operations. The apparatus may comprise means, including, for example processor 110 of FIG. 1, for performance of such operations. In an example embodiment, an apparatus, for example electronic apparatus 100 of FIG. 1, is transformed by having memory, for example memory 140 of FIG. 1, comprising computer code configured to, working with a processor, for example processor 110 of FIG. 1, cause the apparatus to perform set of operations of FIG. 4.

As wireless communication has evolved, it has become increasingly important to facilitate point-to-multipoint communication. In at least one example embodiment, the UE implements Multicast and Broadcast Services (MBS) to provide point-to-multipoint communication with a radio access network (RAN). In some circumstances, it may be desirable to provide different types of MBS services. For example, in some circumstances, it may be desirable for the RAN to support a scenario where the RAN receives a packet to transmit to multiple UEs and performs point-to-point transmissions to each individual UE to send the packet. In this manner, the UE receives the packet by way of a point-to-point communication. In at least one example embodiment, this type of communication is referred to as broadcast MBS. In this manner, broadcast MBS may be characterized by each UE receiving a different copy of the packet by way of an individual point-to-point communication from the RAN.

In other circumstances, it may be desirable for the RAN to support a scenario where the RAN receives a packet to transmit to multiple UEs and performs point-to-multipoint transmissions to each individual UE to send the packet. In this manner, the UE receives the packet by way of a point-to-multipoint communication. In at least one example embodiment, this type of communication is referred to as multicast MBS. In this manner, multicast MBS may be characterized by each UE receiving the same packet by way of a single point-to-multipoint communication from the RAN.

In operation, a UE performs operations for configuring receipt of MBS information and for receiving MBS information. For example, in at least one example embodiment, the UE receives configuration information for one or more MBS sessions. This configuration information comprises parameters needed by the UE to receive the MBS information and to effectively communicate with the RAN regarding the MBS information. For example, the UE may be configured to receive MBS information pertaining to one or more MBS sessions. In at least one example embodiment, an MBS session refers to a communication flow that carries MBS information, such that the UE and the RAN can communicate control information regarding the communication flow by way of identifying the applicable communication flow. In this manner, the UE and the RAN may use an MBS session identifier to designate a particular MBS session. In at least one example embodiment, the UE is configured with an MBS session identifier. The MBS session identifier may then be used for communication between the UE and the RAN to identify a particular MBS session.

Once the UE has been configured to receive MBS information for an MBS session, there are operations to be performed to receive MBS information for the MBS session. In at least one example embodiment, the UE receives a paging transmission that indicates the MBS session identifier of the MBS session, then performs the operations to receive the MBS information for the MBS session indicated in the paging transmission. For example, the paging transmission may include a paging record that indicates the MBS session identifier of the MBS session. In some circumstances, the UE may receive the paging transmission during a time when the UE is not in an RRC_CONNECTED state. For example, the UE may be in an RRC_INACTIVE state. In at least one example embodiment, the UE initiates an RRC connection resumption procedure based on the paging transmission (or the paging record included in a paging transmission) to receive MBS information for the MBS session indicated by the MBS session identifier. In this manner, the RRC connection resumption procedure transitions the UE to a state where it is capable of receiving the MBS information. In this manner, the UE may initiate an RRC connection resumption procedure, based on at least one paging record, since the paging record triggers the initiation.

It may be desirable for the UE to transition from RRC_INACTIVE state to RRC_CONNECTED state to receive broadcast MBS information, due to the point-to-point communication involved. However, for, at least, the reason that the point-to-multipoint communication involved with multicast MBS does not necessarily require the UE to be in RRC_CONNECTED state, it may be desirable for the UE to receive the MBS information while in RRC_INACTIVE state. In at least one example embodiment, the UE utilizes a small data transfer (SDT) procedure that allows transmission of data and/or signaling while the UE remains in RRC_INACTIVE state. Due to the fact that the UE's receiving of the MBS information is initiated by the paging transmission, the SDT procedure in such circumstances is initiated by the RAN rather than initiated by the UE. In at least one example embodiment, an SDT initiated by the RAN is referred to as mobile terminated SDT (MT-SDT).

In at least one example embodiment, the UE initiates MT-SDT by initiating an RRC connection resumption procedure that designates MT-SDT. By initiating the RRC connection resumption procedure that designates MT-SDT, the UE enables the RAN to perform the operations necessary for communicating the MBS information to the UE using SDT, which allows the UE to receive data in the RRC_INACTIVE state. In at least one example embodiment, the UE designates MT-SDT by setting a resume cause of the RRC connection resumption procedure to indicate MT-SDT. In at least one example embodiment, the UE initiates MT-SDT by sending an RRC connection resume request to the RAN that includes a resume cause that identifies MT-SDT.

In at least one example embodiment, the paging transmission indicates whether or not the UE should consider initiating the RRC connection resumption procedure that designates MT-SDT. For example, the RAN may desire the UE to receive information using SDT if conditions are favorable. In at least one example embodiment, the paging transmission includes a MT-SDT indicator. In at least one example embodiment, the presence of the MT-SDT indicator in the paging transmission indicates a directive from the RAN to the UE to initiate the RRC connection resumption procedure that designates MT-SDT. In this manner, the UE may initiate an RRC connection resumption procedure, based on the paging record, since the determination of whether or not to designate MT-SDT in the RRC connection resumption procedure is based, in part, on whether or not the paging transmission designates MT-SDT.

As previously discussed, there may be circumstances where the UE determines to receive MBS information in RRC_CONNECTED state. In such circumstances, the UE initiates the RRC connection resumption procedure with a resume cause the indicates communication in RRC_CONNECTED state. In at least one example embodiment the UE initiates the RRC connection resumption procedure with a resume cause of mobile terminated access (MT-Access) to initiate communication in RRC_CONNECTED state.

Due to the differences between operations for broadcast MBS and operations for multicast MBS, and the differences between capabilities that are available for multicast MBS and for broadcast MBS, the configuration of a broadcast MBS session and a multicast MBS session is different.

In at least one example embodiment, the UE receives configuration information for an MBS session. In at least one example embodiment, the UE receives an MBS configuration message that includes the configuration information for the MBS session. The configuration information comprises parameters that govern the manner in which the UE and the RAN perform communication for the MBS session. In at least one example embodiment, configuration information for a multicast MBS session includes parameters for configuring the multicast MBS session to receive data in an RRC_INACTIVE state. In at least one example embodiment, configuration information for a broadcast MBS session includes parameters for configuring the broadcast MBS session to receive data in an RRC_CONNECTED state. In this manner, the configuration information for a broadcast MBS session is not configured for receiving data in the RRC_INACTIVE state.

In at least one example embodiment, both the configuration information for the multicast MBS session and the configuration information for the broadcast MBS information include an MBS session identifier. The MBS session identifier may be used to identify the MBS session in various circumstances. For example, the MBS session identifier may be used in the paging transmission to identify the MBS session for which the UE is to receive data. In at least one example embodiment, the MBS session identifier is a Temporary Mobile Group Identity (TMGI).

Because broadcast MBS was already deployed before the initial specification of multicast MBS, it may be desirable to provide for backwards compatibility for multicast MBS configuration specification as well as for further configuration specification of broadcast MBS session.

As previously discussed, the configuration information for a multicast MBS session necessarily differs from the configuration information for a broadcast MBS session. In at least one example embodiment, a broadcast MBS session is configured according to a received broadcast MBS session information record. In at least one example embodiment, a multicast MBS session is configured according to a received multicast MBS session information record. In at least one example embodiment, a record is an information element.

In at least one example embodiment, the broadcast MBS session information record includes parameters for specifying the communications for the associated broadcast MBS session. In at least one example embodiment, the broadcast MBS session information record is an MBS-SessionInfo information element. The broadcast MBS session information record may include the following:

- An MBS session identifier, such as a TMGI for identifying the MBS session,
- A Radio Network Temporary Identifier (RNTI), which identifies an RNTI used for scrambling the communications for the MBS session,
- Broadcast specific Multicast Resource Bearer (MRB) configuration information for communications of the MBS session,
- Multicast Traffic Channel (MTCH) configuration information for communications of the MBS session, and
- Physical Downlink Shared Channel (PDSCH) configuration information for communications of the MBS session.

In at least one example embodiment, the UE receives configuration information for a plurality of broadcast MBS sessions. In at least one example embodiment the configuration information for the plurality of broadcast MBS sessions is an MBS session information list for broadcast. In at least one example embodiment, the MBS session information list for broadcast comprises a list of broadcast MBS session information records. In at least one example embodiment, the MBS session information list for broadcast is an MBS-SessionInfoList information element.

In at least one example embodiment, the multicast MBS session information record includes parameters for specifying the communications for the associated multicast MBS session. The multicast MBS session information record may include the following:

- An MBS session identifier, such as a TMGI for identifying the MBS session,
- An RNTI, which identifies an RNTI used for scrambling the communications for the MBS session,
- Multicast specific MRB configuration information for communications of the MBS session,
- MTCH configuration information for communications of the MBS session,
- PDSCH configuration information for communications of the MBS session
- A threshold indicator for receiving data in RRC_INACTIVE state,
- A PDCP synchronization indicator for receiving data in RRC_INACTIVE state, and
- A directive to stop monitoring, such as an indicator that directs the UE to stop monitoring the RNTI for this MBS session.

In at least one example embodiment, the UE receives configuration information for a plurality of multicast MBS sessions. In at least one example embodiment the configuration information for the plurality of multicast MBS sessions is an MBS session information list for multicast. In at least one example embodiment, the MBS session information list for multicast comprises a list of multicast MBS session information records.

From the above discussion, it can be seen that the multicast MBS session information record and the broadcast MBS session information record are distinct from each other. For example, the multicast MBS session information record includes information that cannot be included in the broadcast MBS session information record, such as the Multicast specific MRB configuration information, the threshold indicator, the PDCP synchronization indicator, and the directive to stop monitoring. In addition, a subset of parameters that are included in the multicast MBS session information record are present in the broadcast MBS session information record, such as the MBS session identifier, the RNTI, the MTCH configuration information, and PDSCH configuration information.

In at least one example embodiment, the UE receives an MBS configuration message that includes the configuration information for the MBS session. In at least one example embodiment, there is an MBS multicast configuration message used for configuring multicast MBS and an MBS broadcast configuration message used for configuring broadcast MBS. In at least one example embodiment, the configuration information for the plurality of multicast MBS sessions is received in an MBS multicast configuration message and the configuration information for the plurality of broadcast MBS sessions are received in an MBS broadcast configuration message. In this manner, the MBS multicast configuration message and the MBS broadcast configuration message are distinct from each other. Consequently, in at least one example embodiment, the MBS multicast configuration message includes information that cannot be included in the MBS broadcast configuration message. Likewise, in at least one example embodiment, a subset of parameters included in the MBS multicast configuration message are present in the MBS broadcast configuration message.

Even though there may be benefits associated with providing backwards compatibility by having distinct configuration information structures between broadcast MBS and multicast MBS, it may be desirable to provide a simpler communication structure by providing common structures for configuring broadcast MBS and for configuring multicast MBS.

In some circumstances, it may be desirable to provide a common MBS configuration message. In at least one example embodiment, the common MBS configuration message includes an MBS session information list for multicast and the MBS session information list for broadcast. However, in some circumstances, it may be desirable to provide a common MBS session information list that can include both multicast MBS session information records and broadcast MBS session information records. In at least one example embodiment, the common MBS configuration message includes a common MBS session information list, where each element in the common MBS session information list is either a multicast MBS session information record or a broadcast MBS session information record.

In some circumstances, it may be desirable to provide a common MBS session information record. As previously discussed, the configuration information for a multicast MBS session necessarily differs from the configuration information for a broadcast MBS session. In at least one example embodiment, a broadcast MBS session and a multicast MBS session are each configured according to a received common MBS session information record. In at least one example embodiment, the record is an information element.

In at least one example embodiment, the common MBS session information record includes parameters for specifying the communications for the associated broadcast MBS session or multicast MBS session. In at least one example embodiment, the common MBS session information record is an MBS-SessionInfo information element. In at least one example embodiment, the common MBS information element is specified by mandatory parameters and optional parameters, where a mandatory parameter is a parameter that is common to both multicast MBS session configuration and broadcast MBS session configurations, and an optional parameter is a parameter that is specific to only one of the broadcast MBS session configuration or the multicast MBS session configuration. In is noted that the terms optional and mandatory are used solely to characterize the nature of the parameters with regard to the common configuration structure and do not pertain to any determination of whether an associated feature is mandatory or optional as a claim element. In this manner, the use of the terms optional and mandatory does not limit the claims in any way, unless such terms are expressly incorporated into the claims. The common MBS session information record may include the following:

Mandatory—An MBS session identifier, such as a TMGI for identifying the MBS session,
    Mandatory—An RNTI, which identifies an RNTI used for scrambling the communications for the MBS session,
    Mandatory—MRB configuration information, which is one of:
      Broadcast specific MRB configuration information for communications of the MBS session, or
      Multicast specific MRB configuration information for communications of the MBS session,
    Mandatory—Multicast Traffic Channel (MTCH) configuration information for communications of the MBS session, and
    Mandatory—PDSCH configuration information for communications of the MBS session.
    Optional—A threshold indicator for receiving data in RRC_INACTIVE state,
    Optional—A PDCP synchronization indicator for receiving data in RRC_INACTIVE state, and
    Optional—A directive to stop monitoring, such as an indicator that directs the UE to stop monitoring the RNTI for this MBS session.

In at least one example embodiment, the UE receives configuration information for a plurality of MBS sessions, which can be a plurality of multicast MBS sessions and a plurality of broadcast MBS sessions. In at least one example embodiment the configuration information for the plurality of MBS sessions is a common MBS session information list. In at least one example embodiment, the common MBS session information list comprises a list of common MBS session information records. In at least one example embodiment, the MBS session information list for broadcast is an MBS-SessionInfoList information element.

In at least one example embodiment, the configuration information for a plurality of multicast MBS sessions corresponds with the common MBS session information records that include the optional parameters that are specific to multicast MBS. In at least one example embodiment, the configuration information for a plurality of broadcast MBS sessions corresponds with the common MBS session information records that do not include the optional parameters that are specific to multicast MBS.

At interaction 410, UE 401 receives, from Radio Access Network (RAN) 408 configuration information for a plurality of multicast MBS sessions and configuration information for a plurality of broadcast MBS sessions. In at least one example embodiment, the UE is in RRC_CONNECTED state when receiving the configuration information.

At interaction 411, UE 401 receives an RRC release message from RAN 408. In at least one example embodiment, the UE is in RRC_CONNECTED state when receiving the RRC release message and transitions to RRC_INACTIVE in response to receiving the RRC release message.

At interaction 412, UE 401 receives a paging transmission from RAN 408. In at least one example embodiment, the paging transmission includes at least one paging record. In at least one example embodiment, the UE is in RRC_INACTIVE when receiving the paging transmission. In at least one example embodiment, the paging record indicates a particular UE for receiving the paging record. In at least one example embodiment, the UE has an assigned RNTI, and the paging record includes a UE identity that matches the RNTI of the UE. For example, the RNTI of the UE may be a full I-RNTI. In at least one example embodiment, the paging record includes a MT-SDT indicator.

In at least one example embodiment, the paging record includes a paging group list that indicates one or more MBS sessions for which the UE is to receive MBS information. In at least one example embodiment, the paging group list is a list of MBS session identifiers. In at least one example embodiment, the paging group list includes one or more MBS session identifiers that identify one or more MBS sessions for which the UE has been configured.

In at least one example embodiment, the paging transmission is a paging message received from a base station, such as base station 202 of FIG. 2. In at least one example embodiment, the paging transmission is a message transfer sidelink message received from another UE, such as UE 204 of FIG. 2. In such an example, the other UE may be a Layer 2 (L2) UE to Network (U2N) Relay UE.

At interaction 413, UE 401 initiates an RRC connection resumption procedure with a resume cause set to indicate MT-SDT and sends an RRC resume request with a resume cause that indicates MT-SDT. It should be noted, even though the example of FIG. 4 shows that the UE sends an RRC resume request indicating MR-SDT, in some circumstances, the UE may be desirable for the UE to instead send an RRC resume request indicating MT-Access instead of MT-SDT.

At set of interactions 420, UE 401 and RAN 408 perform SDT communication. In at least one example embodiment, the SDT communication involves the apparatus receiving MBS information in RRC_INACTIVE state.

In some circumstances, it may be desirable to ensure that one or more conditions are satisfied before the UE initiates the RRC connection resumption procedure that designates MT-SDT. For example, in some circumstances, it may be desirable to initiate the RRC connection resumption procedure that designates MT-Access, even though the UE received a paging transmission that includes the MT-SDT indicator.

In some circumstances, it may be desirable to ensure that conditions for receiving data in the RRC_INACTIVE state are satisfied before initiating the RRC connection resumption procedure that designates MT-SDT. In at least one example embodiment, the UE determines whether or not conditions for receiving data in the RRC_INACTIVE state are satisfied. In at least one example embodiment, the UE initiates the RRC connection resumption procedure that designates MT-SDT in circumstances where it has determined that the conditions for receiving data in the RRC_INACTIVE state are satisfied, and UE initiates the RRC connection resumption procedure that designates MT-Access in circumstances where it has determined that the conditions for receiving data in the RRC_INACTIVE state are not satisfied. In at least one example embodiment, the MAC entity determines whether or not conditions for receiving data in the RRC_INACTIVE state are satisfied.

In at least one example embodiment, determining whether or not conditions for receiving data in the RRC_INACTIVE state are satisfied comprises determining, by the MAC entity, whether or not conditions for initiating SDT procedures are fulfilled. For example, it may be desirable to ensure that a downlink pathloss reference has a high enough measured Reference Signal Received Power (RSRP) for SDT to be reliably effective. In such circumstances, it may be desirable to configure an RSRP threshold for SDT.

For example, it may be desirable to avoid initiating SDT procedures in circumstances where a measured RSRP of a downlink pathloss reference is less than or equal to a configured RSRP threshold for SDT. In addition, it may be desirable to initiate SDT procedures in circumstances where the measured RSRP of the downlink pathloss reference is higher than the configured RSRP threshold for SDT. In at least one example embodiment, the UE determines whether or not a measured RSRP of a downlink pathloss reference is higher than a configured RSRP threshold for SDT. In at least one example embodiment, the UE initiates the RRC connection resumption procedure that designates MT-SDT in circumstances where it has determined that the measured RSRP of the downlink pathloss reference is higher than the configured RSRP threshold for SDT, and UE initiates the RRC connection resumption procedure that designates MT-Access in circumstances where it has determined that the measured RSRP of the downlink pathloss reference is not higher than the configured RSRP threshold for SDT.

In some circumstances, the paging group list included in the paging transmission may indicate an MBS session that is not configured for receiving data in an RRC_INACTIVE state. For example, the paging group may indicate a broadcast MBS session. In such circumstances, the UE may necessarily need to receive MBS information for the broadcast MBS session in RRC_CONNECTED state. Therefore, it may be desirable for the UE to initiate an RRC connection resumption procedure that designates MT-Access in circumstances where it has determined that the paging group list included in the paging transmission indicates an MBS session that is not configured for receiving data in an RRC_INACTIVE state. Consequently, it may be desirable for the UE to initiate an RRC connection resumption procedure that designates MT-SDT in circumstances where it has determined that all MBS sessions indicated by the MBS session identifiers included in the paging group list are configured for receiving data in an RRC_INACTIVE state (for example, in circumstances where all MBS sessions indicated by the MBS session identifiers included in the paging group list are multicast MBS sessions).

In at least one example embodiment, the UE determines whether or not all MBS sessions indicated by the MBS session identifiers included in the paging group list are configured for receiving data in an RRC_INACTIVE state. In at least one example embodiment, the UE initiates the RRC connection resumption procedure that designates MT-SDT in circumstances where it has determined that all MBS sessions indicated by the MBS session identifiers included in the paging group list are configured for receiving data in an RRC_INACTIVE state, and UE initiates the RRC connection resumption procedure that designates MT-Access in circumstances where it has determined that not all MBS sessions indicated by the MBS session identifiers included in the paging group list are configured for receiving data in an RRC_INACTIVE state.

Figure 5:
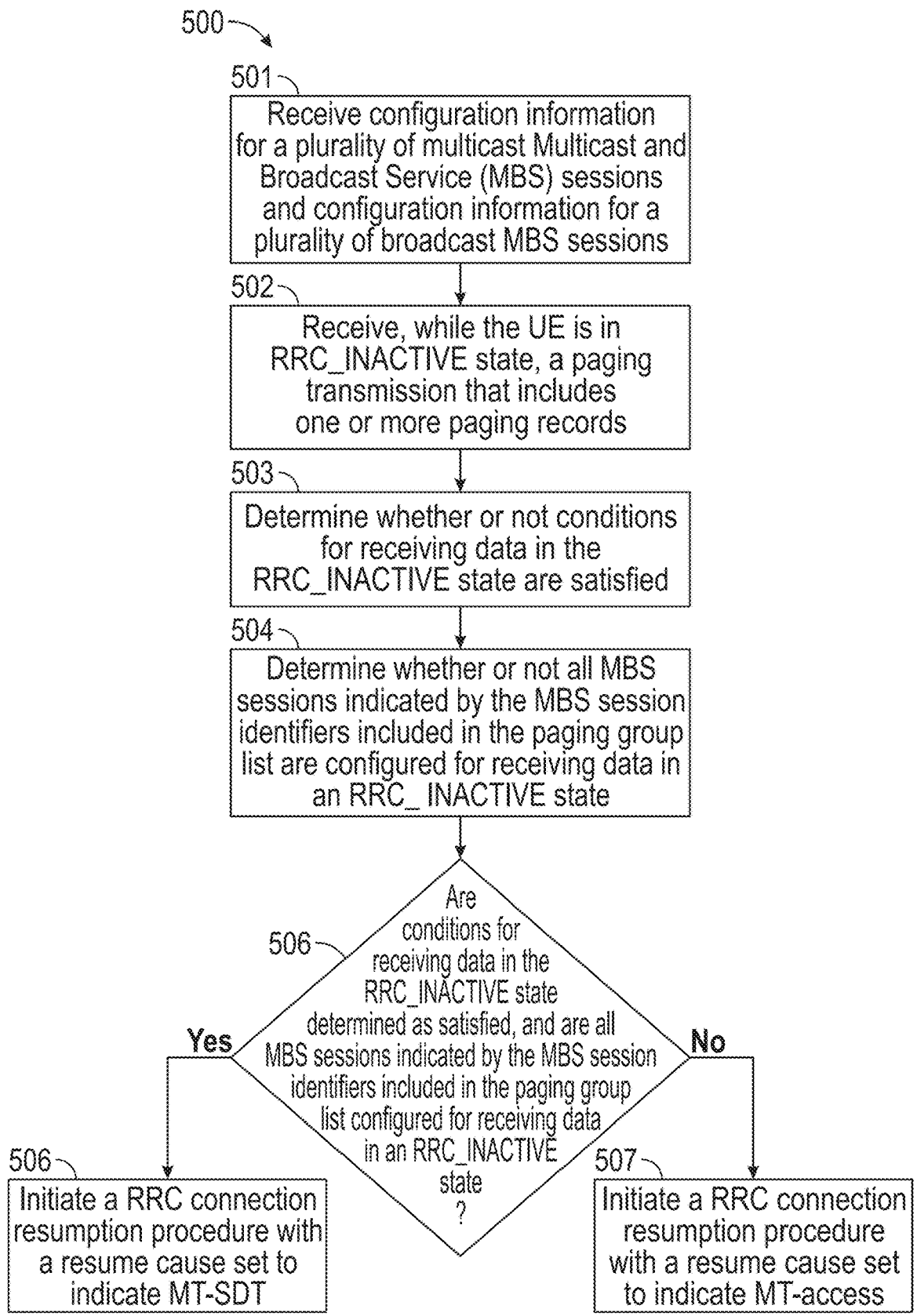
FIG. 5 is a flow diagram illustrating activities associated with initiating communication according to at least one example embodiment.

FIG. 5 is a flow diagram illustrating activities associated with initiating communication according to at least one example embodiment. In at least one example embodiment, there is a set of operations that corresponds with the activities of FIG. 5. An apparatus, for example electronic apparatus 100 of FIG. 1, or a portion thereof, may utilize the set of operations. The apparatus may comprise means, including, for example processor 110 of FIG. 1, for performance of such operations. In an example embodiment, an apparatus, for example electronic apparatus 100 of FIG. 1, is transformed by having memory, for example memory 140 of FIG. 1, comprising computer code configured to, working with a processor, for example processor 110 of FIG. 1, cause the apparatus to perform the set of operations of FIG. 5.

At block 501, the apparatus receives configuration information for a plurality of multicast MBS sessions and configuration information for a plurality of broadcast MBS sessions.

At block 502, the apparatus receives, while the UE is in RRC_INACTIVE state, a paging transmission that includes at least one paging record.

At block 503, the apparatus determines whether or not conditions for receiving data in the RRC_INACTIVE state are satisfied.

At block 504, the apparatus determine whether or not all MBS sessions indicated by the MBS session identifiers included in the paging group list are configured for receiving data in an RRC_INACTIVE state.

At block 505, if conditions for receiving data in the RRC_INACTIVE state are determined as satisfied and all MBS sessions indicated by the MBS session identifiers included in the paging group list are configured for receiving data in an RRC_INACTIVE state, flow proceeds to block 506. If the apparatus has determined that conditions for receiving data in the RRC_INACTIVE state are determined as not satisfied, or not all MBS sessions indicated by the MBS session identifiers included in the paging group list are configured for receiving data in an RRC_INACTIVE state, flow proceeds to block 507.

At block 506, the apparatus initiates an RRC connection resumption procedure with a resume cause set to indicate MT-SDT. In this manner, the UE initiates an RRC connection resumption procedure, based on the at least one paging record, with a resume cause set to indicate MT-SDT in circumstances where conditions for receiving data in the RRC_INACTIVE state are determined as satisfied and all MBS sessions indicated by the MBS session identifiers included in the paging group list are configured for receiving data in an RRC_INACTIVE state.

At block 507, the apparatus initiates an RRC connection resumption procedure with a resume cause set to indicate MT-Access. In this manner, the UE initiates an RRC connection resumption procedure, based on the at least one paging record, with a resume cause set to indicate MT-Access in circumstances where conditions for receiving data in the RRC_INACTIVE state are determined as not satisfied, or not all MBS sessions indicated by the MBS session identifiers included in the paging group list are configured for receiving data in an RRC_INACTIVE state.

Embodiments of the invention may be implemented in software, hardware, application logic or a combination of software, hardware, and application logic. The software, application logic and/or hardware may reside on the apparatus, a separate device, or a plurality of separate devices. If desired, part of the software, application logic and/or hardware may reside on the apparatus, part of the software, application logic and/or hardware may reside on a separate device, and part of the software, application logic and/or hardware may reside on a plurality of separate devices. In an example embodiment, the application logic, software or an instruction set is maintained on any one of various conventional computer-readable media.

If desired, the different functions discussed herein may be performed in a different order and/or concurrently with each other. For example, block 503 of FIG. 5 may be performed after block 504 of FIG. 5. Furthermore, if desired, one or more of the above-described functions may be optional or may be combined. For example, blocks 503 and 504 of FIG. 5 may be optional and/or combined with block 505 of FIG. 5.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are variations and modifications which may be made without departing from the scope of the present invention as defined in the appended claims.

What is claimed is:

1. A method performed by a user equipment (UE) comprising:
   receiving configuration information for a plurality of multicast Multicast and Broadcast Service (MBS) sessions that are configured for receiving data in an RRC_INACTIVE state and configuration information for a plurality of broadcast MBS sessions;
   receiving, while the UE is in RRC_INACTIVE state, a paging transmission that includes at least one paging record and a paging group list comprising a plurality of MBS session identifiers, the paging record comprising:
      a UE identity that matches a Radio Network Temporary Identifier (RNTI) of the UE, and
      a mobile terminated small data transmission (MT-SDT) indicator
   determining whether or not conditions for receiving data in the RRC_INACTIVE state are satisfied;
   determining whether or not all MBS sessions indicated by the MBS session identifiers included in the paging group list are configured for receiving data in an RRC_INACTIVE state;
   initiating an RRC connection resumption procedure, based on the at least one paging record, with a resume cause set to indicate MT-SDT in circumstances where:
      conditions for receiving data in the RRC_INACTIVE state are determined as satisfied, and
      all MBS sessions indicated by the MBS session identifiers included in the paging group list are configured for receiving data in an RRC_INACTIVE state; and
   initiating an RRC connection resumption procedure, based on the at least one paging record, with a resume cause set to indicate mobile terminated access (MT-Access) in circumstances where:
      conditions for receiving data in the RRC_INACTIVE state are determined as not satisfied, or
      not all MBS sessions indicated by the MBS session identifiers included in the paging group list are configured for receiving data in an RRC_INACTIVE state.

2. The method of claim 1, wherein:
   the MBS session identifier is a Temporary Mobile Group Identity (TMGI),
   each multicast MBS session and each broadcast MBS session is identified by a TMGI, and
   determining whether or not all MBS sessions indicated by the MBS session identifiers included in the paging group list are configured for receiving data in an RRC_INACTIVE state comprises determining whether or not each of the TMGI included in the paging group list identifies an MBS session that is configured for receiving data in an RRC_INACTIVE state.

3. The method of claim 1, wherein determining whether or not conditions for receiving data in the RRC_INACTIVE state are satisfied comprises determining, by a Medium Access Control (MAC) entity, whether or not a Reference Signal Received Power (RSRP) of a downlink pathloss reference is higher than a configured RSRP threshold for small data transmission (SDT).

4. The method of claim 1, wherein:
   the configuration information for the plurality of multicast MBS sessions is received in an MBS multicast configuration message,
   the configuration information for the plurality of broadcast MBS sessions is received in an MBS broadcast configuration message, and the MBS multicast configuration message and the MBS broadcast configuration message are distinct from each other.

5. The method of claim 4, wherein:
the MBS multicast configuration message includes information that cannot be included in the MBS broadcast configuration message, and
a subset of parameters included in the MBS multicast configuration message are present in the MBS broadcast configuration message.

6. The method of claim 1, wherein:
the configuration information for the plurality of multicast MBS sessions and the configuration information for the plurality of broadcast MBS sessions are received in a common MBS configuration message,
the configuration information for the plurality of multicast MBS sessions comprises an MBS session information list for multicast, and
the configuration information for the plurality of broadcast MBS sessions is an MBS session information list for broadcast.

7. The method of claim 6, wherein:
the configuration information for the plurality of multicast MBS sessions and the configuration information for the plurality of broadcast MBS sessions are included in a common MBS session information list,
the configuration information for the plurality of multicast MBS sessions comprises a plurality of common MBS session information elements included in the common MBS session information list, and
the plurality of broadcast IBS sessions are a plurality of common IBS session information elements included in the common MBS session information list that are different from the common MBS session information elements of the multicast MBS sessions.

8. A user equipment (UE) comprising:
at least one processor;
at least one memory including computer program code, the memory and the computer program code configured to, working with the processor, cause the UE to perform at least the following:
  receive configuration information for a plurality of multicast Multicast and Broadcast Service (MBS) sessions that are configured for receiving data in an RRC_INACTIVE state and configuration information for a plurality of broadcast MBS sessions;
  receive, while the UE is in RRC_INACTIVE state, a paging transmission that includes at least one paging record and a paging group list comprising a plurality of MBS session identifiers, the paging record comprising:
    a UE identity that matches a Radio Network Temporary Identifier (RNTI) of the UE, and
    a mobile terminated small data transmission (MT-SDT) indicator
  determine whether or not conditions for receiving data in the RRC_INACTIVE state are satisfied;
  determine whether or not all MBS sessions indicated by the MBS session identifiers included in the paging group list are configured for receiving data in an RRC_INACTIVE state;
  initiate an RRC connection resumption procedure, based on the at least one paging record, with a resume cause set to indicate MT-SDT in circumstances where:
    conditions for receiving data in the RRC_INACTIVE state are determined as satisfied, and
    all MBS sessions indicated by the MBS session identifiers included in the paging group list are configured for receiving data in an RRC_INACTIVE state; and
  initiate an RRC connection resumption procedure, based on the at least one paging record, with a resume cause set to indicate mobile terminated access (MT-Access) in circumstances where:
    conditions for receiving data in the RRC_INACTIVE state are determined as not satisfied, or
    not all MBS sessions indicated by the MBS session identifiers included in the paging group list are configured for receiving data in an RRC_INACTIVE state.

9. The UE of claim 8, wherein:
the MBS session identifier is a Temporary Mobile Group Identity (TMGI), each multicast MBS session and each broadcast MBS session is identified by a TMGI, and
determining whether or not all MBS sessions indicated by the MBS session identifiers included in the paging group list are configured for receiving data in an RRC_INACTIVE state comprises determining whether or not each of the TMGI included in the paging group list identifies an MBS session that is configured for receiving data in an RRC_INACTIVE state.

10. The UE of claim 8, wherein determining whether or not conditions for receiving data in the RRC_INACTIVE state are satisfied comprises determining, by a Medium Access Control (MAC) entity, whether or not a Reference Signal Received Power (RSR) of a downlink pathloss reference is higher than a configured RSRP threshold for small data transmission (SDT).

11. The UE of claim 8, wherein:
the configuration information for the plurality of multicast MBS sessions is received in an MBS multicast configuration message,
the configuration information for the plurality of broadcast MBS sessions is received in an MBS broadcast configuration message, and
the MBS multicast configuration message and the MBS broadcast configuration message are distinct from each other.

12. The UE of claim 11, wherein:
the MBS multicast configuration message includes information that cannot be included in the MBS broadcast configuration message, and
a subset of parameters included in the MBS multicast configuration message are present in the MBS broadcast configuration message.

13. The UE of claim 8, wherein:
the configuration information for the plurality of multicast MBS sessions and the configuration information for the plurality of broadcast MBS sessions are received in a common MBS configuration message,
the configuration information for the plurality of multicast MBS sessions comprises an MBS session information list for multicast, and
the configuration information for the plurality of broadcast MBS sessions is an MBS session information list for broadcast.

14. The UE of claim 13, wherein:
the configuration information for the plurality of multicast MBS sessions and the configuration information for the plurality of broadcast MBS sessions are included in a common MBS session information list,
the configuration information for the plurality of multicast MBS sessions comprises a plurality of common MBS session information elements included in the common MBS session information list, and the plurality of broadcast IBS sessions are a plurality of common IBS session information elements included in the common MBS session information list that are different from the common MBS session information elements of the multicast MBS sessions.

15. At least one non-transitory computer-readable medium encoded with instructions that, when executed by a processor in a user equipment (UE), perform:

receiving configuration information for a plurality of multicast Multicast and Broadcast Service (MBS) sessions that are configured for receiving data in an RRC_INACTIVE state and configuration information for a plurality of broadcast IBS sessions;

receiving, while the UE is in RRC_INACTIVE state, a paging transmission that includes at least one paging record and a paging group list comprising a plurality of IBS session identifiers, the paging record comprising:
a UE identity that matches a Radio Network Temporary Identifier (RNTI) of the UE, and
a mobile terminated small data transmission (MT-SDT) indicator determining whether or not conditions for receiving data in the RRC_INACTIVE state are satisfied;

determining whether or not all MBS sessions indicated by the MBS session identifiers included in the paging group list are configured for receiving data in an RRC_INACTIVE state;

initiating an RRC connection resumption procedure, based on the at least one paging record, with a resume cause set to indicate MT-SDT in circumstances where:
conditions for receiving data in the RRC_INACTIVE state are determined as satisfied, and
all MBS sessions indicated by the MBS session identifiers included in the paging group list are configured for receiving data in an RRC_INACTIVE state; and initiating an RRC connection resumption procedure, based on the at least one paging record, with a resume cause set to indicate mobile terminated access (MT-Access) in circumstances where:
conditions for receiving data in the RRC_INACTIVE state are determined as not satisfied, or
not all MBS sessions indicated by the MBS session identifiers included in the paging group list are configured for receiving data in an RRC_INACTIVE state.

16. The medium of claim 15, wherein:
the MBS session identifier is a Temporary Mobile Group Identity (TMGI),
each multicast MBS session and each broadcast MBS session is identified by a TMGI, and
determining whether or not all MBS sessions indicated by the MBS session identifiers included in the paging group list are configured for receiving data in an RRC_INACTIVE state comprises determining whether or not each of the TMGI included in the paging group list identifies an MBS session that is configured for receiving data in an RRC_INACTIVE state.

17. The medium of claim 15, wherein determining whether or not conditions for receiving data in the RRC_INACTIVE state are satisfied comprises determining, by a Medium Access Control (MAC) entity, whether or not a Reference Signal Received Power (RSRP) of a downlink pathloss reference is higher than a configured RSRP threshold for SDT.

18. The medium of claim 15, wherein:
the configuration information for the plurality of multicast MBS sessions is received in an MBS multicast configuration message,
the configuration information for the plurality of broadcast MBS sessions is received in an MBS broadcast configuration message, and
the MBS multicast configuration message and the MBS broadcast configuration message are distinct from each other.

19. The medium of claim 18, wherein:
the MBS multicast configuration message includes information that cannot be included in the MBS broadcast configuration message, and
a subset of parameters included in the MBS multicast configuration message are present in the MBS broadcast configuration message.

20. The medium of claim 15, wherein:
the configuration information for the plurality of multicast MBS sessions and the configuration information for the plurality of broadcast MBS sessions are received in a common MBS configuration message,
the configuration information for the plurality of multicast MBS sessions comprises an MBS session information list for multicast, and
the configuration information for the plurality of broadcast MBS sessions is an MBS session information list for broadcast.

* * * * *

UNITED STATES PATENT AND TRADEMARK OFFICE
CERTIFICATE OF CORRECTION

PATENT NO. : 12,324,046 B1  
APPLICATION NO. : 19/006079  
DATED : June 3, 2025  
INVENTOR(S) : Kenneth McClure Page 1 of 1

It is certified that error appears in the above-identified patent and that said Letters Patent is hereby corrected as shown below:

In the Claims

Column 23, Lines 31, delete "IBS" and insert --MBS--;  
Column 23, Lines 32, delete "IBS" and insert --MBS--.

Column 24, Line 30, delete "(RSR)" and insert --(RSRP)--.

Column 25, Line 3, delete "IBS" and insert --MBS--;  
Column 25, Line 4, delete "IBS" and insert --MBS--;  
Column 25, Line 15, delete "IBS" and insert --MBS--;  
Column 25, Line 19, delete "IBS" and insert --MBS--.

Signed and Sealed this  
Twenty-sixth Day of August, 2025

Coke Morgan Stewart  
*Acting Director of the United States Patent and Trademark Office*